(12) United States Patent
Matsumoto

(10) Patent No.: US 10,992,111 B2
(45) Date of Patent: Apr. 27, 2021

(54) LIGHTNING STRIKE SUPPRESSION TYPE LIGHTNING PROTECTION DEVICE AND LIGHTNING ARRESTOR

(71) Applicant: LIGHTNING SUPPRESSION SYSTEMS CO., LTD., Kanagawa (JP)

(72) Inventor: Toshio Matsumoto, Kanagawa (JP)

(73) Assignee: LIGHTNING SUPRESSION SYSTEMS CO., LTD., Kanagawa (JP)

( * ) Notice: Subject to any disclaimer, the term of this patent is extended or adjusted under 35 U.S.C. 154(b) by 131 days.

(21) Appl. No.: 16/343,352

(22) PCT Filed: Jul. 28, 2017

(86) PCT No.: PCT/JP2017/027568
§ 371 (c)(1),
(2) Date: Apr. 18, 2019

(87) PCT Pub. No.: WO2018/074030
PCT Pub. Date: Apr. 26, 2018

(65) Prior Publication Data
US 2019/0245327 A1      Aug. 8, 2019

(30) Foreign Application Priority Data

Oct. 21, 2016 (JP) .............................. JP2016-207275
May 16, 2017 (JP) .............................. JP2017-097676
Jul. 28, 2017 (JP) .............................. JP2017-146990

(51) Int. Cl.
*H05F 3/04* (2006.01)
*H01T 4/00* (2006.01)
(Continued)

(52) U.S. Cl.
CPC ................. *H01T 4/10* (2013.01); *H01T 4/00* (2013.01); *H01T 4/02* (2013.01); *H05F 3/04* (2013.01)

(58) Field of Classification Search
USPC ........................................................ 361/117
See application file for complete search history.

(56) References Cited

U.S. PATENT DOCUMENTS 6,320,119 B1     11/2001    Gumley

FOREIGN PATENT DOCUMENTS

| EP | 0139575 A2 | 5/1985 |
| EP | 0228984 A2 | 7/1987 |

(Continued)

OTHER PUBLICATIONS

Toshio Matsumoto; Title: Wind turbine blade; Mar. 2, 2016; Entire disclosure (Year: 2016).*

(Continued)

*Primary Examiner* — Dharti H Patel
(74) *Attorney, Agent, or Firm* — Calfee, Halter & Griswold LLP

(57) ABSTRACT

The occurrence of an upward streamer is effectively suppressed by reducing a positively charged region formed around a lightning protection device as much as possible. The lightning protection device includes: an inner electrode body 2 which is grounded; an outer electrode body 3 which is provided so as to enclose the inner electrode body 2 with a predetermined gap G from the inner electrode body 2; an electrical insulator S which is provided in the gap G to hold the inner electrode body 2 and the outer electrode body 3 in a state of being electrically insulated from each other; and a support body for the inner electrode body, in which the inner electrode body 2 is formed in a substantially spherical shape, the outer electrode body 3 is formed in a spherical shell shape similar to an outer surface shape of the inner electrode body 2, and substantially an entire surface of the inner electrode body 2 is covered by the outer electrode body 3.

30 Claims, 12 Drawing Sheets

(51) Int. Cl.
*H01T 4/10* (2006.01)
*H01T 4/02* (2006.01)

(56) References Cited

FOREIGN PATENT DOCUMENTS

| | | |
|---|---|---|
| JP | 2005019390 A | 1/2005 |
| JP | 2010205687 A | 9/2010 |
| JP | 5839331 B1 | 1/2016 |
| JP | 2016009534 A | 1/2016 |
| JP | 5874992 B1 | 3/2016 |

OTHER PUBLICATIONS

English Translation of International Search Report from PCT/JP2017/027568 dated Oct. 24, 2017 (1 page).
Extended European Search Report of EP 17 86 3126 dated May 19, 2020 (8 pages).

\* cited by examiner

LIGHTNING STRIKE SUPPRESSION TYPE LIGHTNING PROTECTION DEVICE AND LIGHTNING ARRESTOR

CROSS-REFERENCE TO RELATED APPLICATIONS

This application is a 371 of PCT Application No. PCT/JP2017/027568 filed on Jul. 28, 2017, which claim priority to Japanese Application No. 2016-207275 filed on Oct. 21, 2016, Japanese Application No. 2017-097676 filed on May 16, 2017 and Japanese Application No. 2017-146990 filed on Jul. 28, 2017, the contents of which are hereby incorporated by reference as if recited in their entirety.

TECHNICAL FIELD

The present invention relates to a lightning strike suppression type lightning protection device and a lightning arrestor for protecting an object to be protected, such as buildings or facilities, from lightning damage by suppressing lightning strikes.

BACKGROUND ART

A lightning strike is a discharge phenomenon that occurs in the atmosphere. Lighting discharges include an intracloud discharge, a cloud-to-cloud discharge, and a cloud-to-ground discharge. Among the lighting discharges, the cloud-to-ground discharge (hereinafter referred to as lightning strike) causes great damage. The lightning strike is a phenomenon that occurs when the electric field strength between a thundercloud (cloud base) and the ground or a structure built on the ground or the like becomes extremely high and the charge becomes saturated and breaks down the insulation of the atmosphere.

When a lightning strike phenomenon is observed in detail, in a case of a general lightning strike (summer lightning) that occurs in the summer, as a thundercloud matures, a stepped leader from the thundercloud seeks out a place where the atmosphere is likely to be discharged and approaches the ground.

When the stepped leader reaches a certain distance from the ground, an upward streamer (streamer) of a weak current develops from the ground, a building (lightning rod), a tree, or the like toward the stepped leader.

When this streamer and the stepped leader are coupled to each other, a large current (return current) flows between the thundercloud and the ground through the coupling path.

This is the lightning strike phenomenon.

As a conventional lightning protection concept against such a lightning strike phenomenon, from the viewpoint that a lightning strike cannot be prevented, in most cases, a method in which a lightning strike is received by a pointed lightning rod (Franklin rod) and conducted to the ground is used.

Contrary to this, the present inventors have proposed a lightning strike suppression type lightning protection device described in Patent Document 1 in order to protect an object to be protected by suppressing the occurrence of a lightning strike as much as possible.

The lightning strike suppression type lightning protection device includes an upper electrode body and a lower electrode body with an insulator interposed therebetween, and is constructed by grounding only the lower electrode body.

In addition, for example, when a thundercloud with a negative charge distributed at the cloud base approaches, the opposite charge (positive charge) is distributed on the surface of the ground and the positive charge gathers also in the lower electrode body which is grounded.

Then, the upper electrode body which is disposed via the insulator has a negative charge due to the action of a capacitor.

By this action, the occurrence of an upward streamer in the lightning protection device and its surroundings is hindered, so that the occurrence of a lightning strike is suppressed.

CITATION LIST

Patent Document

Patent Document 1: JP 5839331 B1

SUMMARY OF THE INVENTION

Problem to be Solved by the Invention

According to the above-described proposal by the present inventors, a lightning strike can be suppressed in a circular protection region around the lightning protection device.

However, in the above-described proposal, since a positive charge region is formed in the lower electrode body which is a lower constituent body of the lightning protection device, depending on the energy of a lightning strike, a lightning strike to the lower electrode body is considered. Therefore, a finding that it is necessary to reduce the positive charge region described above as much as possible has been reached.

Means for Solving Problem

The invention has been made based on the above findings, and a lightning protection device includes an inner electrode body which is grounded; an outer electrode body which is provided so as to enclose the inner electrode body with a predetermined gap from the inner electrode body; an electrical insulator which is provided in the gap to hold the inner electrode body and the outer electrode body in a state of being electrically insulated from each other; and a support body which supports at least one of the inner electrode body and the outer electrode body.

With such a configuration, substantially the entire inner electrode body which is grounded is enclosed and covered by the outer electrode body, and the outer electrode body is disposed in a state of being electrically insulated from the inner electrode body.

When a thundercloud with a negative charge distributed at the cloud base approaches, the opposite charge (positive charge) is distributed on the surface of the ground, and the positive charge gathers also in the inner electrode body grounded to the ground.

Then, the outer electrode body disposed with the electrical insulator interposed between the inner electrode body and the outer electrode body has a negative charge due to the action of a capacitor.

By this action, the occurrence of an upward streamer in the outer electrode body and its surroundings is hindered, and as a result, the occurrence of a lightning strike is suppressed.

Here, since the outer electrode body is disposed so as to enclose the inner electrode body, most of the surroundings around the lightning protection device are covered with a negative charge.

Therefore, a positively charged region in the lightning protection device is suppressed to be extremely reduced, and the occurrence of an upward streamer can be effectively suppressed when a thundercloud approaches. As a result, a lightning strike suppression effect can be increased.

In the lightning protection device of the invention, the inner electrode body is formed in a substantially spherical shape or a spherical shell shape, and the outer electrode body is formed in a spherical shell shape so as to enclose and cover the substantially spherical or spherical shell-shaped inner electrode body which is grounded, so that the spherical shell-shaped outer electrode body is disposed in an electrically insulated state.

In the lightning protection device of the invention, in order to enhance a function of covering most of the surroundings around the lightning protection device with a negative charge, a configuration may be adopted in which the outer electrode body is formed in a spherical shell shape similar to an outer surface shape of the inner electrode body to cause substantially the entire surface of the inner electrode body to be covered by the outer electrode body.

In the lightning protection device of the invention, a configuration may be adopted in which the support body includes a conductive support body provided in the inner electrode body, and the conductive support body is grounded.

In the lightning protection device of the invention, a configuration may be adopted in which the support body includes a cylindrical support body provided in the outer electrode body, and the cylindrical support body is supported via an insulator. With this configuration, it is possible to support the outer electrode body with the cylindrical support body.

In the lightning protection device of the invention, a configuration may be adopted in which a through-hole through which an inside and an outside of the outer electrode body communicate with each other is formed in a lower portion of the outer electrode body, the support body electrically connected to the inner electrode body is inserted through the through-hole in a state of being electrically insulated from the outer electrode body. With this configuration, it is possible to support and install the outer electrode body, the inner electrode body, and the electrical insulator with the support body, and a lightning protection function can be secured by grounding the inner electrode body.

In the lightning protection device of the invention, a configuration may be adopted in which the through-hole of the outer electrode body is set to a size through which the inner electrode body is able to be inserted into the outer electrode body. With such a configuration, the manufacturability and assembly workability can be greatly improved.

The electrical insulator may be constituted by a spacer which is disposed in the gap and is formed of an electrically insulating material which holds the inner electrode body and the outer electrode body at a predetermined interval, and a space formed in the gap.

In addition, the electrical insulator may be formed by providing a spacer formed of an electrically insulating material over an entire region of the gap formed between the inner electrode body and the outer electrode body.

In addition, the inner electrode body and the outer electrode body may have a substantially truly spherical shape or elliptical shape in a vertical section. Furthermore, the outer electrode body may be formed in an inner hollow cylindrical shape, and the inner electrode body may be formed in a cylindrical shape or an inner hollow cylindrical shape.

Particularly, by forming the elliptical shape as in the latter, it is possible to reduce the air resistance against a strong wind.

On the other hand, the outer electrode body may be constituted by a pair of outer electrode constituent bodies formed to be divided into two parts, and the pair of outer electrode constituent bodies may be caused to abut each other with the electrical insulator interposed between the outer electrode constituent bodies so as to enclose the inner electrode body, and are integrated by being connected in an electrically conductive state at abutting portions. Accordingly, the outer electrode body can be integrated with the inner electrode body.

In addition, the pair of outer electrode constituent bodies may be integrated by welding the abutting portions, or by being screwed to each other at the abutting portions.

A lightning strike suppression type lightning arrestor of the invention includes: an inner electrode body; an outer electrode body which is disposed so as to enclose the inner electrode body with a predetermined gap from the inner electrode body; and an electrical insulator which is provided in the gap to hold the inner electrode body and the outer electrode body in a state of being electrically insulated from each other.

According to the lightning arrestor of the invention, since the outer electrode body is disposed to enclose the inner electrode body, a configuration is possible in which most of the surroundings around the outer electrode body is covered with a negative charge. Furthermore, since the inner electrode body is configured to be enclosed by the outer electrode body as described above, a configuration is possible in which a lower portion of the outer electrode body is positioned below the inner electrode body. Accordingly, a configuration is also possible in which the inner electrode body is not exposed.

In the invention, a configuration may be adopted in which the inner electrode body and the outer electrode body are provided with a connection portion for connection to a support body which supports at least one of the inner electrode body or the outer electrode body.

Even in the lightning arrestor of the invention, the inner electrode body is formed in a substantially spherical shape or a spherical shell shape, and the outer electrode body is formed in a spherical shell shape. Preferably, the inner electrode body and the outer electrode body are formed in a substantially truly spherical shape. Furthermore, the inner electrode body and the outer electrode body are formed in an elliptical shape in a vertical section. Furthermore, the outer electrode body is formed in an inner hollow cylindrical shape, and the inner electrode body is formed in a cylindrical shape or an inner hollow cylindrical shape. Accordingly, the entire structure can be made compact and lightweight.

Even in the lightning arrestor of the invention, a configuration may be adopted in which a through-hole through which an inside and an outside of the outer electrode body communicate with each other is formed in the outer electrode body, and the support body electrically connected to the inner electrode body is inserted through the through-hole in a state of being electrically insulated from the outer electrode body.

An inner diameter of the through-hole of the outer electrode body may be set to be smaller or set to be larger than an outer diameter of the inner electrode body.

In a case where the inner diameter of the through-hole is set to be smaller than the outer diameter of the inner electrode body, it is possible to prevent the inner electrode body from coming out of the through-hole.

In a case where the inner diameter of the through-hole is set to be larger than the outer diameter of the inner electrode body, an operation of inserting the inner electrode body into the outer electrode body by utilizing the through-hole may be adopted.

In the invention, a structure may be adopted in which the inner electrode body and the support body are integrated with each other by welding.

Furthermore, the inner electrode body and the support body may be integrally formed by a conductive metal.

In the invention, a configuration may be adopted in which the outer electrode body is provided with a cylindrical skirt portion forming an inner wall surface of the through-hole.

In the invention, a length of the skirt portion may be formed to be larger than an outer diameter of the outer electrode body.

Effect of the Invention

According to the lightning strike suppression type lightning protection device of the invention, the occurrence of an upward streamer is effectively suppressed by reducing a positively charged region formed around the lightning protection device as much as possible, and accordingly, a lightning strike suppression effect can be increased.

In addition, according to the lightning arrestor of the invention, in addition to the above effect, simplification and a reduction in the weight of a structure, the improvement in manufacturability, and the like can be achieved.

MODE(S) FOR CARRYING OUT THE INVENTION

Hereinafter, a first embodiment of the invention will be described with reference to FIGS. 1 to 3.

Figure 1:
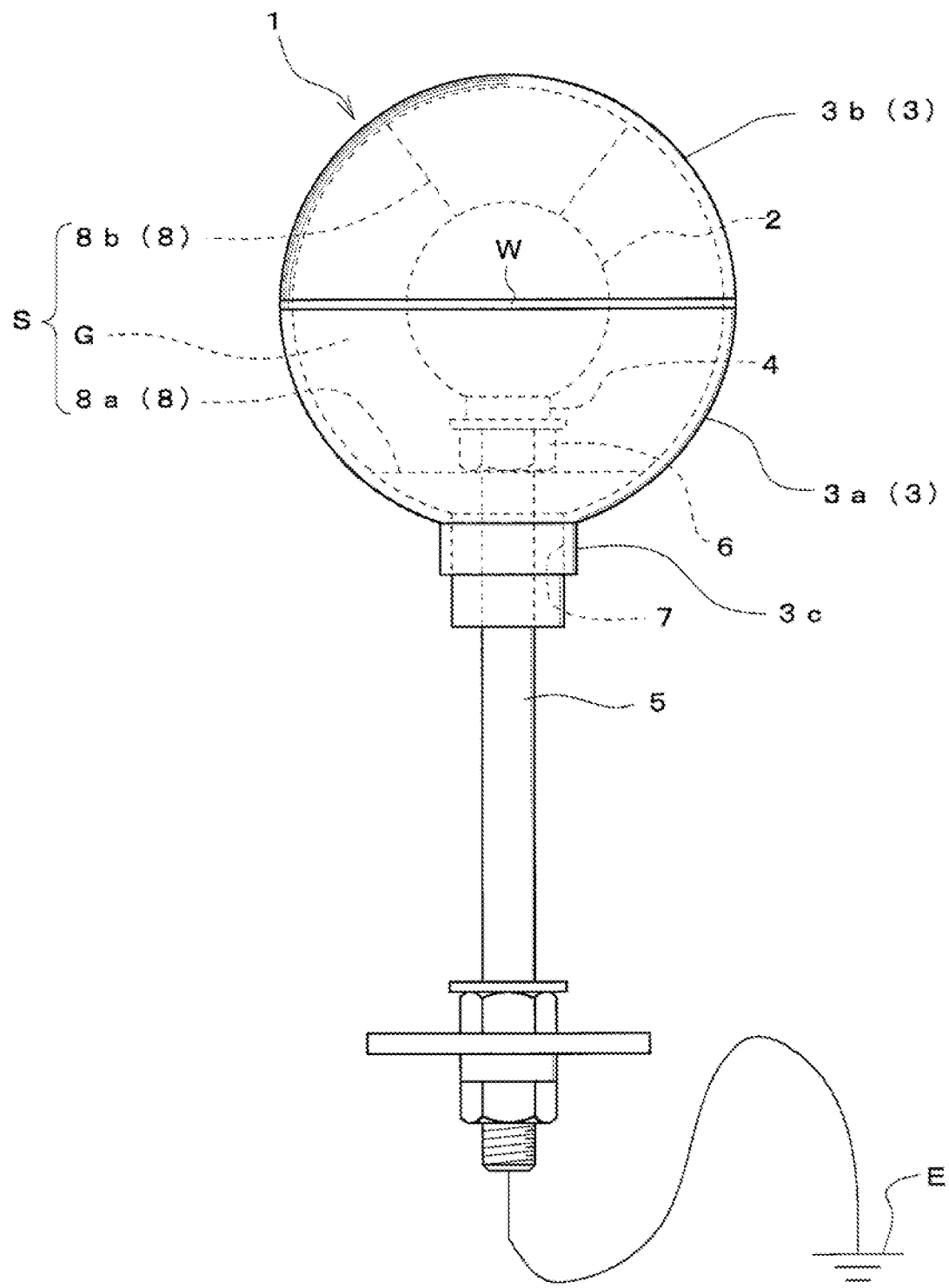
FIG. 1 is a front view illustrating a first embodiment of the invention.

In FIG. 1, reference numeral 1 denotes a lightning strike suppression type lightning protection device (hereinafter, referred to as lightning protection device) according to this embodiment. In the embodiment of the invention, a lightning arrestor means a lightning arrestor portion indicated by reference numeral 1A as illustrated in FIG. 2, and means a configuration in a state where an inner electrode body thereof is not grounded. As illustrated in FIG. 3, the lightning protection device means a configuration in which the inner electrode body of the lightning arrestor 1A portion is grounded via a support body or the like and a lightning protection function can be exhibited.

The lightning protection device 1 of this embodiment includes an inner electrode body (second electrode body) 2 which is grounded, an outer electrode body (first electrode body) 3 provided so as to enclose the inner electrode body 2 with a predetermined gap G therebetween, and an electrical insulator (electrical insulating layer) S provided in the gap G to hold the inner electrode body 2 and the outer electrode body 3 in a state of being electrically insulated from each other. The inner electrode body 2 is formed in a substantially spherical shape, and the outer electrode body 3 is formed in a spherical shell shape similar to the outer surface shape of the inner electrode body 2. Substantially the entire surface of the inner electrode body 2 is covered by the outer electrode body 3.

Figure 2:
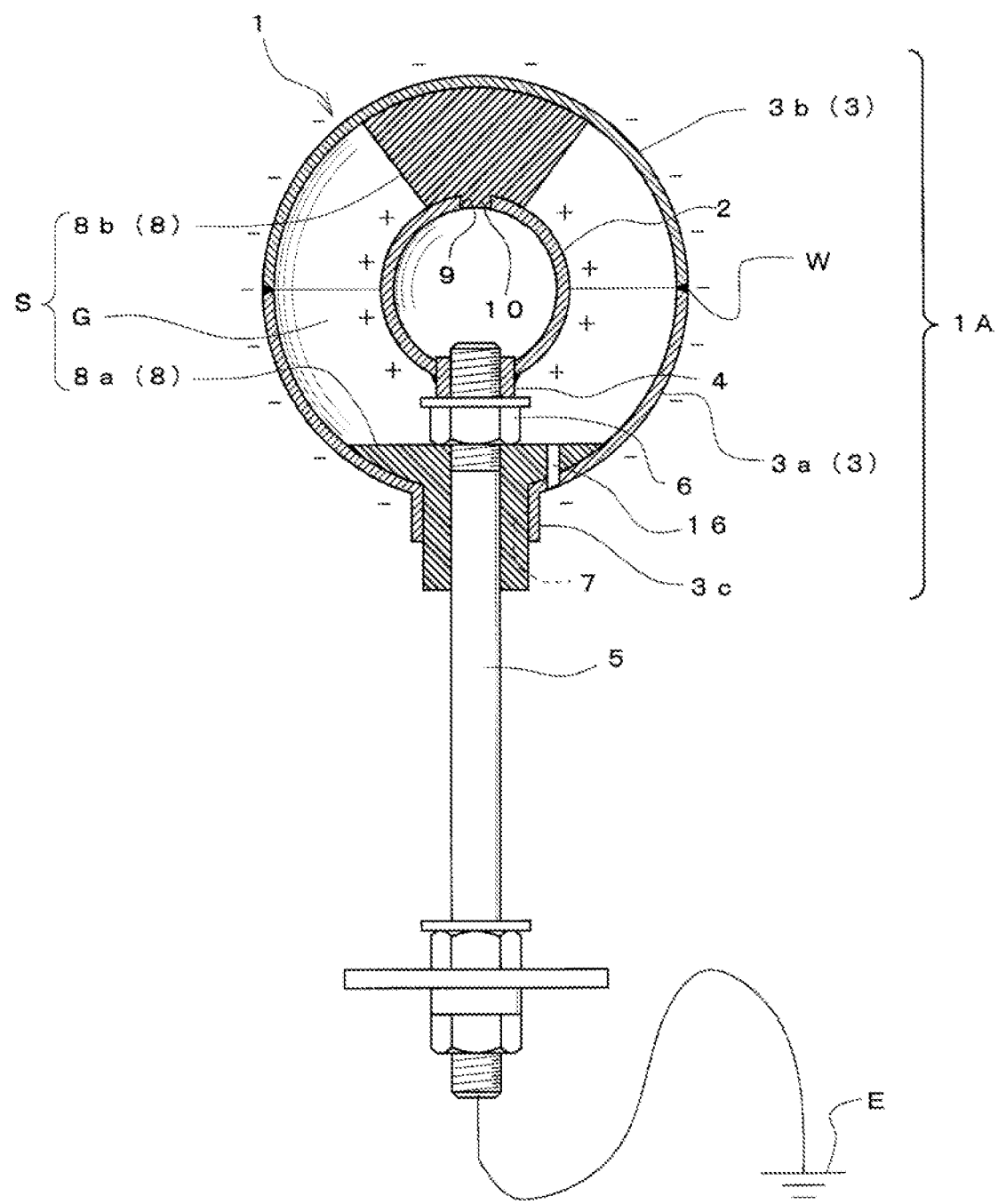
FIG. 2 is a longitudinal sectional view illustrating the first embodiment of the invention.

The inner electrode body 2 has a truly spherical shape and is formed in a hollow shape having a predetermined thickness as illustrated in FIG. 2. The inner electrode body 2 is not limited to a hollow shape, and a solid sphere can be used.

Furthermore, a nut 4 is integrally attached to the lower portion of the inner electrode body 2, and a tip of a support rod (support body) 5, which will be described later, is screwed into the nut 4.

A lock nut 6 is screwed to the support rod 5, and the lock nut 6 is pressed against the nut 4, whereby the support rod 5 and the inner electrode body 2 are fixed to each other.

In this embodiment, as illustrated in FIG. 2, the lightning arrestor 1A includes the inner electrode body 2, the outer electrode body 3, the electrical insulator S, and the support body 5 connected to the inner electrode body 2.

The outer electrode body 3 is constituted by a pair of outer electrode constituent bodies 3a and 3b formed to be horizontally divided into two parts. The outer electrode body 3 may also be configured to be vertically divided into two parts (vertically split).

The pair of outer electrode constituent bodies 3a and 3b are caused to abut each other with the electrical insulator S interposed therebetween so as to enclose the inner electrode body 2, and are integrated by welding (welded portions W) at the abutting portions.

A through-hole 7 through which the inside and the outside communicate with each other is formed at the center of the lower portion of the outer electrode constituent body 3a on the lower side. The support rod 5 electrically connected to the inner electrode body 2 is inserted through the through-hole 7, and the inner electrode body 2 is grounded via the support rod 5.

The electrical insulator S is constituted by a spacer 8 which is disposed in the gap G and is formed of an electrically insulating material which holds the inner electrode body 2 and the outer electrode body 3 at a predetermined interval, and the gap G forming a space between the inner electrode body 2 and the outer electrode body 3. As the electrically insulating material, a synthetic resin, ceramic, or the like can be suitably used, and other electrically insulating materials can also be used.

In this embodiment, the spacer 8 is constituted by a lower spacer 8a disposed below the inner electrode body 2, and an upper spacer 8b disposed above the inner electrode body 2.

The lower spacer 8a is fitted into the through-hole 7 of the outer electrode constituent body 3a on the lower side, and has a shape that is in surface contact with the inner surface of the lower portion of the outer electrode constituent body 3a on the lower side.

The lower spacer 8a and the outer electrode constituent body 3a on the lower side are integrated with each other by an adhesive or the like.

The support rod 5 penetrates the center portion of the lower spacer 8a, and the support rod 5 is connected to the outer electrode constituent body 3a on the lower side with a predetermined gap held therebetween in a state of being electrically insulated therefrom by the lower spacer 8a.

A skirt portion 3c forming the through-hole 7 through which the support rod 5 is inserted extends from the center of the lower portion of the outer electrode constituent body 3a. The lower end of the lower spacer 8a protrudes beyond the lower end of the skirt portion 3c. The protrusion length is preferably equal to or more than the gap (interval) between the inner electrode body 2 and the outer electrode body 3.

Figure 6:
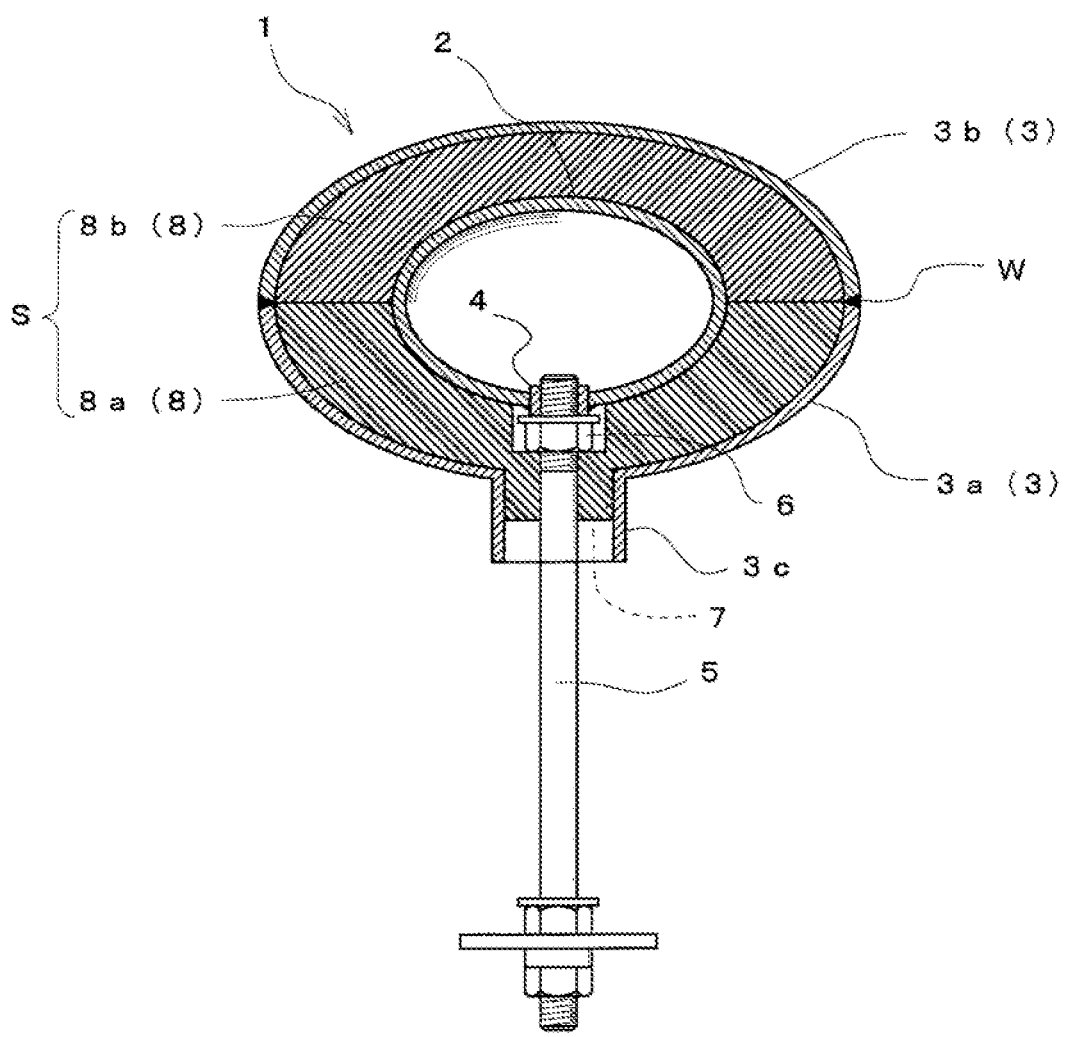
FIG. 6 is a longitudinal sectional view illustrating a fourth embodiment of the invention.

The lower end of the skirt portion 3c may be designed to protrude beyond the lower end of the lower spacer 8a (see FIG. 6). In this case, the long skirt portion 3c can also exhibit a function of protecting the lower spacer 8a made of an insulator from a severe natural environment such as ultraviolet rays and wind and rain.

The upper spacer 8b is formed to have spherical surfaces such that the lower surface follows the outer surface of the inner electrode body 2 and the upper surface follows the inner surface of the outer electrode body 3, and a positioning protrusion 10 which is fitted into a locking hole 9 formed in the upper portion of the inner electrode body 2 protrudes from the lower surface of the upper spacer 8b.

The upper spacer 8b is also fixed to the inner electrode body 2 and the outer electrode body 3 by an adhesive or the like.

As illustrated in FIG. 2, the inner diameter of the through-hole 7 is set to be smaller than the outer diameter of the inner electrode body 2. In FIG. 2, reference numeral 16 denotes an internal pressure adjustment hole which communicates to the inside and the outside of the outer electrode body 3. Accordingly, the inner electrode body 2 is configured not to come out even if the internal pressure of the outer electrode body 3 rapidly increases due to an unpredictable lightning strike or the like. The internal pressure adjustment hole 16 may be provided with a valve body that opens at a predetermined internal pressure, a plug body that comes out, or the like.

The lightning protection device 1 of tis embodiment is assembled in the following procedure.

First, the lower spacer 8a is fixed to the bottom portion of the inner surface of the outer electrode constituent body 3a on the lower side so as to block the through-hole 7 provided at the bottom portion.

Next, the support rod 5 to which the inner electrode body 2 is fixed is inserted into the lower spacer 8a, and the upper spacer 8b is fixed to the upper portion of the inner electrode body 2 while fitting the positioning protrusion 10 thereof into the locking hole 9 of the inner electrode body 2.

The outer electrode constituent body 3b on the upper side is overlaid on the upper spacer 8b so as to cover the same, and the lower portion thereof is caused to abut the outer electrode constituent body 3a on the lower side.

Accordingly, the abutting portions of the outer electrode constituent bodies 3a and 3b on the upper and lower sides are connected to each other by welding, thereby completing the assembly.

In the lightning protection device 1 of this embodiment assembled as described above, the outer electrode body 3 is connected to the inner electrode body 2 with a predetermined interval therebetween in a state of being electrically insulated therefrom by the lower spacer 8a and the upper spacer 8b.

In addition, the outer electrode body 3, the inner electrode body 2, and the electrical insulator S are supported by the support rod 5.

In the assembled state as described above, the outer electrode body 3 is positioned so as to cover substantially the entire circumference of the inner electrode body 2.

The inner electrode body 2 is electrically led to the outside of the outer electrode body 3 via the support rod 5.

The lightning protection device 1 of this embodiment configured as described above is installed on an object to be protected from a lightning strike or around the object, using the support rod 5, an additional support member (a rod member or cylindrical member for connection), or an elongated member. As illustrated in FIGS. 1 and 3, the support rod 5 is grounded to a ground E directly or via a grounding wire or the like.

Next, a lightning strike suppression function of the lightning protection device 1 of this embodiment installed as described above will be described.

Figure 3:
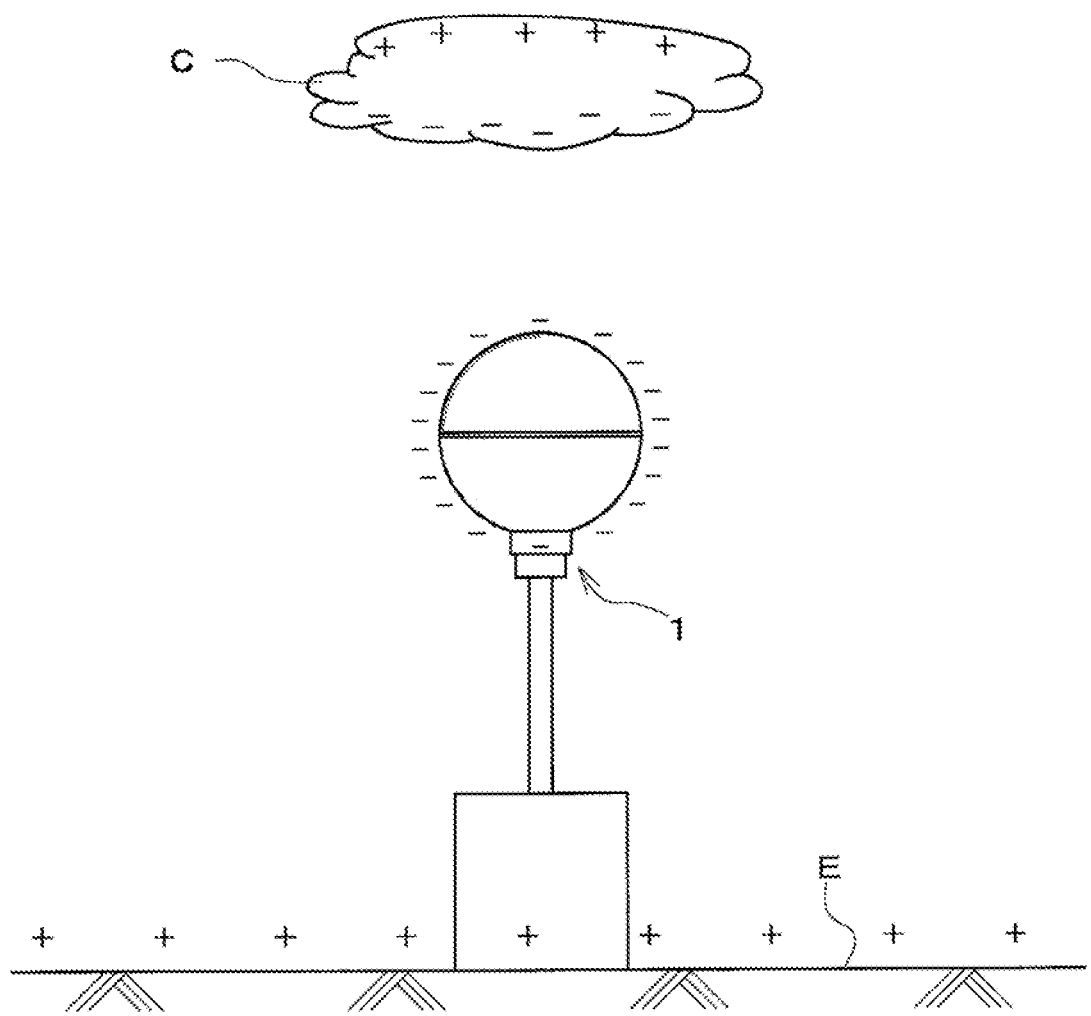
FIG. 3 is a schematic view for describing an action of suppressing the occurrence of a streamer in the invention.

As illustrated in FIG. 3, when a thundercloud C with a negative charge distributed at the cloud base approaches, the opposite charge (positive charge) is distributed on the surface of the ground E, and the positive charge gathers also in the inner electrode body 2 grounded to the ground E via the support rod 5 as illustrated in FIG. 2.

On the other hand, the outer electrode body 3 facing the inner electrode body 2 via the electrical insulator S has a negative charge due to the action of a capacitor.

By this action, the occurrence of an upward streamer in the outer electrode body 3 and its surroundings is hindered, and as a result, the occurrence of a lightning strike is suppressed.

Since the outer electrode body 3 is provided so as to cover substantially the entire circumference of the inner electrode body 2, most of the upper end portion of the lightning protection device 1 of this embodiment has a negative charge.

Accordingly, the region of the positive charge that causes an upward streamer can be greatly reduced, and thus the lightning strike suppression effect can be greatly improved.

Figure 4:
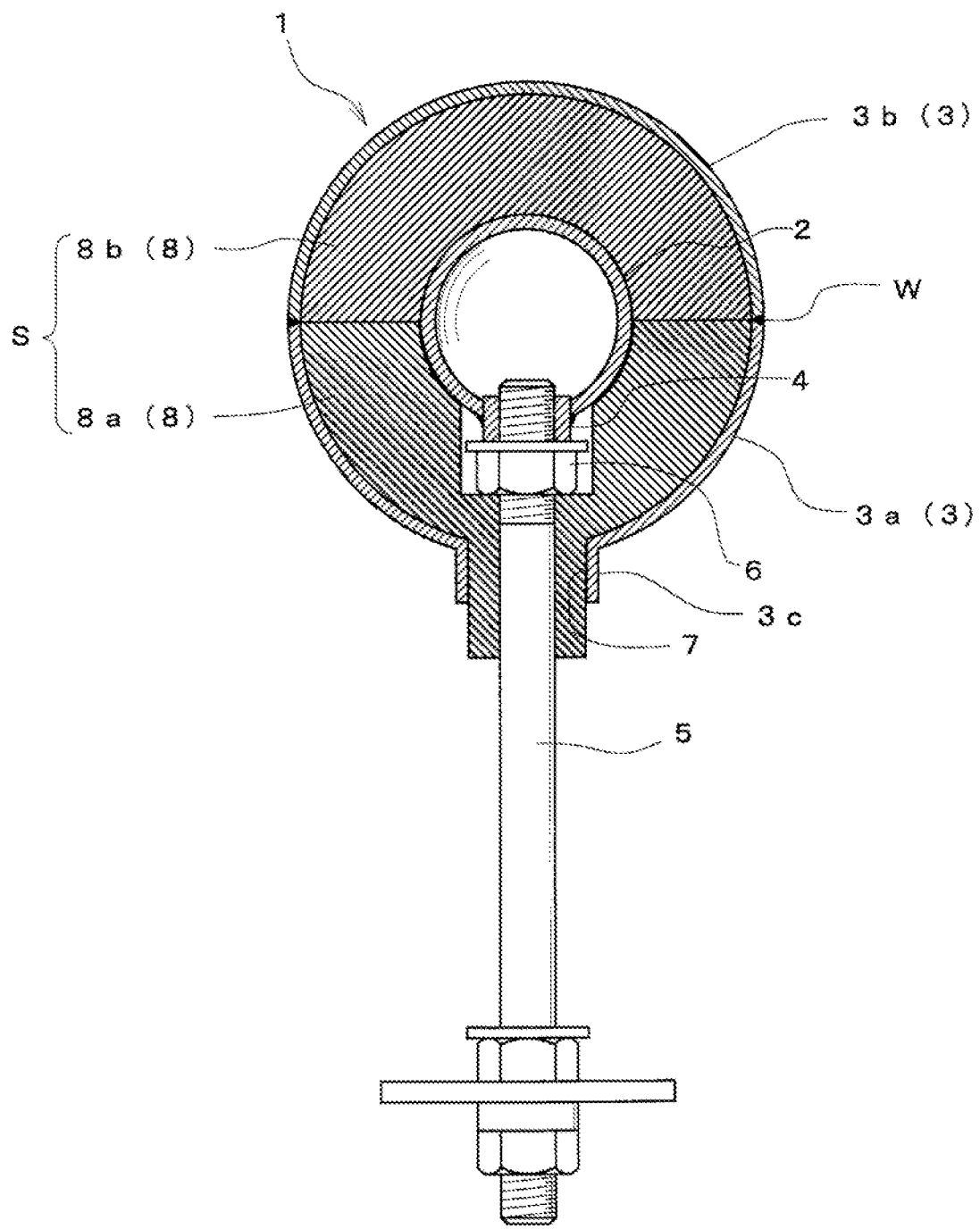
FIG. 4 is a longitudinal sectional view illustrating a second embodiment of the invention.

FIG. 4 illustrates a second embodiment of the invention, in which the electrical insulator S is configured by providing the lower spacer 8a and the upper spacer 8b over the entire region of the gap G formed between the inner electrode body 2 and the outer electrode body 3.

With such a configuration, the outer electrode body 3, the inner electrode body 2, and the support rod 5 can be rigidly connected to each other.

Furthermore, by eliminating the space inside the outer electrode body 3, a change in the internal pressure can be reduced as much as possible, so that the soundness of the lightning protection device 1 of the invention can be improved.

Figure 5:
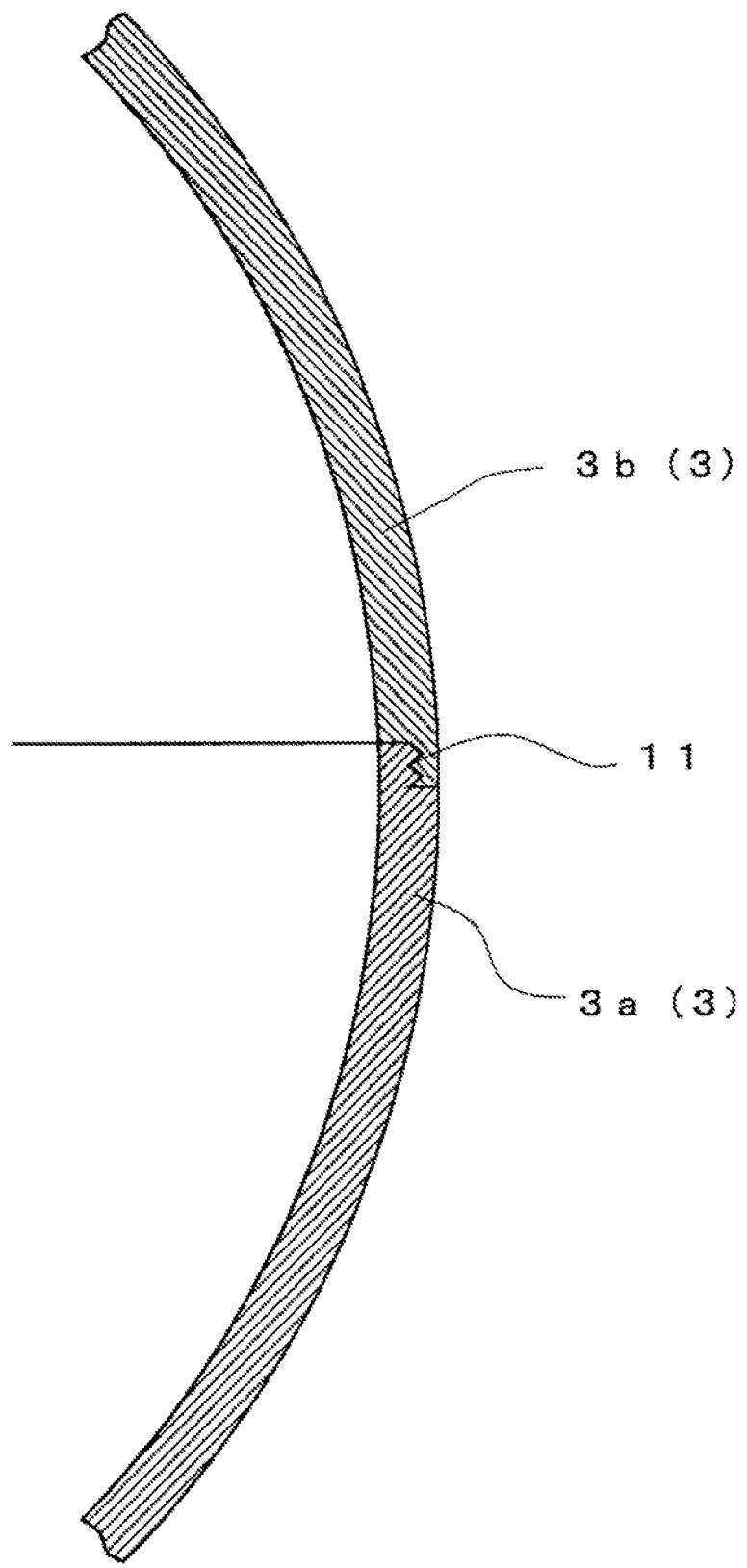
FIG. 5 is a longitudinal sectional view of the main portion, illustrating a third embodiment of the invention.

FIG. 5 illustrates a third embodiment of the invention, in which the connection of the outer electrode constituent bodies 3a and 3b is performed by a screw 11.

With such a configuration, the assembly operation of the outer electrode body 3 can be simplified.

Furthermore, FIG. 6 illustrates a fourth embodiment of the invention, in which the shapes of the outer electrode body 3 and the inner electrode body 2 are elliptical in a vertical section. In this embodiment, an example in which the lower end of the skirt portion 3c is set to be positioned below the lower end of the lower spacer 8a is described.

With such a configuration, the fluid resistance against the wind in a horizontal direction can be reduced. Accordingly, the strength of the lightning protection device 1 against the wind can be increased.

In addition, the long skirt portion 3c can also exhibit a function of protecting the lower spacer 8a made of an insulator from a severe natural environment such as ultraviolet rays and wind and rain.

Figure 7:
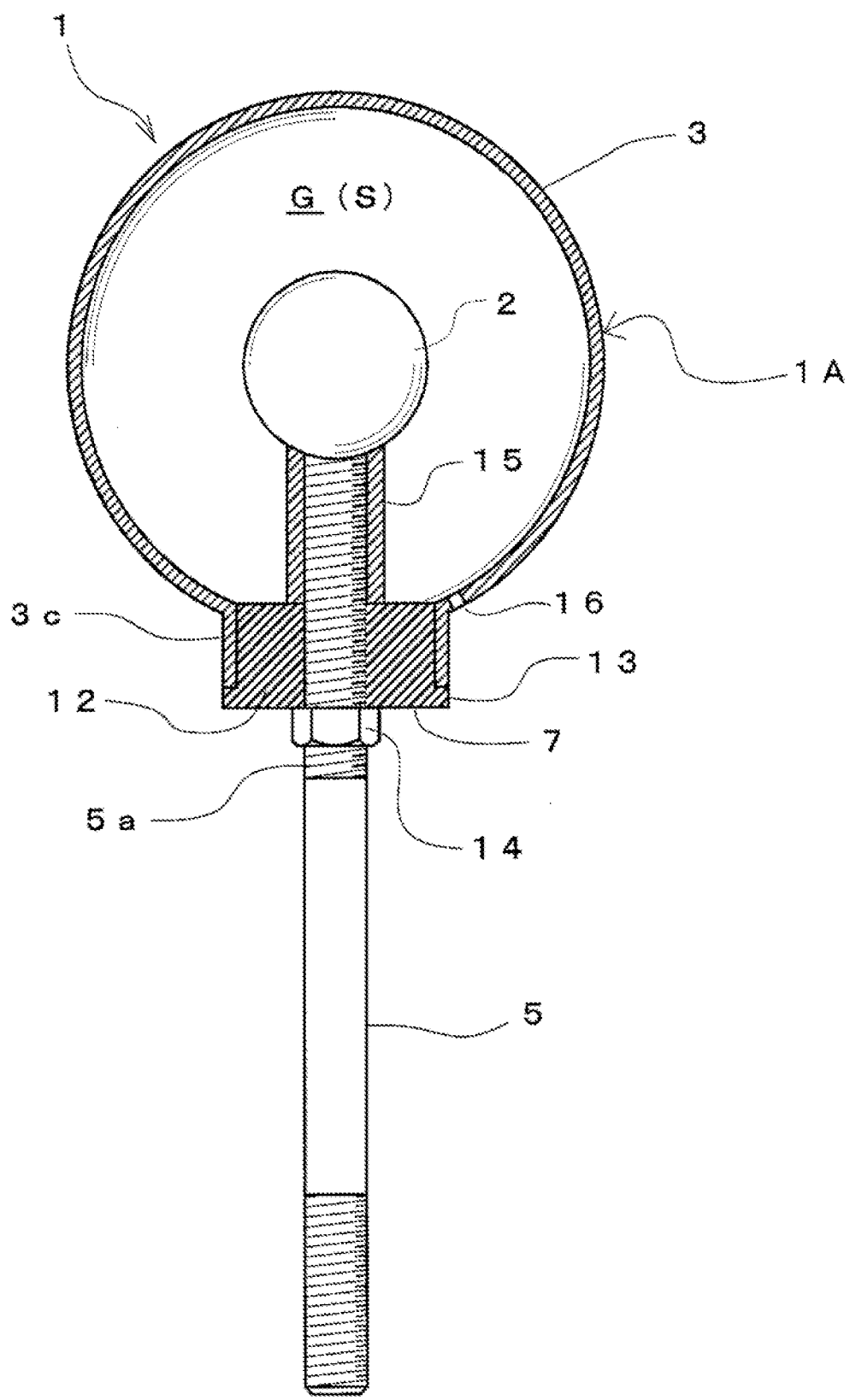
FIG. 7 is a longitudinal sectional view illustrating a fifth embodiment of the invention.

Moreover, FIG. 7 illustrates a fifth embodiment of the invention.

In this embodiment, the outer electrode body 3 is formed in a continuous spherical shell shape, and from the lower portion thereof, the skirt portion 3c that forms the through-hole 7 through which the support rod 5 is inserted extends.

A first spacer 12 which has the support rod 5 inserted therethrough and holds the support rod 5 at a predetermined interval from the inner surface of the skirt portion 3c is attached to the skirt portion 3c.

The first spacer 12 is formed of an electrically insulating material and electrically insulates the support rod 5 from the skirt portion 3c.

The first spacer 12 is fitted into the skirt portion 3c from the outside of the outer electrode body 3, and is fixed to the skirt portion 3c by adhesion, screwing, or both of them. As a matter of course, the space 12 can be screwed to the skirt portion 3c. In this case, a method of screwing the spacer 12 at a plurality of points with intervals along the circumferential direction of the skirt portion 3c, a method of screwing the spacer 12 in multiple stages with vertical intervals, or the like may be adopted.

A collar 13 that is brought into contact with the lower end surface of the skirt portion 3c is formed integrally with the lower end portion of the first spacer 12, and by the contact between the collar 13 and the skirt portion 3c, positioning between the two is achieved.

On the other hand, the inner electrode body 2 is formed in a spherical body or a spherical shell and is formed to have an outer diameter smaller than the inner diameter of the skirt portion 3c formed in the outer electrode body 3 so that the inner electrode body 2 can be inserted into the outer electrode body 3 through the skirt portion 3c.

While the inner electrode body 2 is fixed to the tip of the support rod 5, a male thread 5a is formed in a predetermined region directed from the tip portion to the base end portion of the support rod 5. The inner electrode body 2 and the support rod 5 are integrated with each other by welding. Instead of the welding, one end of the support rod 5 may be screwed into and fixed to a threaded hole provided in the inner electrode body 2.

A lock nut 14 is screwed to the support rod 5 via the male thread 5a, the first spacer 12 is fitted to a side closer to the tip of the support rod 5 than the lock nut 14, and a second spacer 15 which is cylindrical is fitted to a side closer to the tip of the support rod 5 than the first spacer 12.

As described above, in a state where the lock nut 14, the first spacer 12, and the second spacer 15 are attached to the support rod 5, the tip portion of the support rod 5 protrudes from the second spacer 15. The inner electrode body 2 is fixed to the protruding tip portion by fixing means such as threaded connection or welding.

By screwing the lock nut 14 toward the inner electrode body 2, the first spacer 12 and the second spacer 15 are interposed and fixed between the lock nut 14 and the inner electrode body 2.

By the fixing, the distance between the first spacer 12 and the inner electrode body 2 is set. However, this interval is determined by the thickness of the first spacer 12 and the length of the second spacer 15.

The inner electrode body 2 is inserted into the outer electrode body 3 through the through-hole 7 of the skirt portion 3c and is positioned in the outer electrode body 3 by the collar 13 of the first spacer 12 being brought into contact with the lower end of the skirt portion 3c.

Here, by setting the thickness of the first spacer 12 and the length of the second spacer 15, the inner electrode body 2 can be positioned at the center of the outer electrode body 3.

Accordingly, the gap G which is uniform over substantially the entire circumference between the inner electrode body 2 and the outer electrode body 3 can be formed.

That is, the electrical insulator S which is uniform due to the air around the member can be formed around the inner electrode body 2.

The first spacer 12 and the support rod 5 may be screwed to each other using the male thread 5a, or the second spacer 15 can be formed of an electrically insulating material and integrated with the first spacer 12.

With such a configuration, the outer electrode body 3 can be formed of a single member, so that the number of components can be reduced, the configuration can be simplified, and the manufacturability can be improved.

Figure 8:
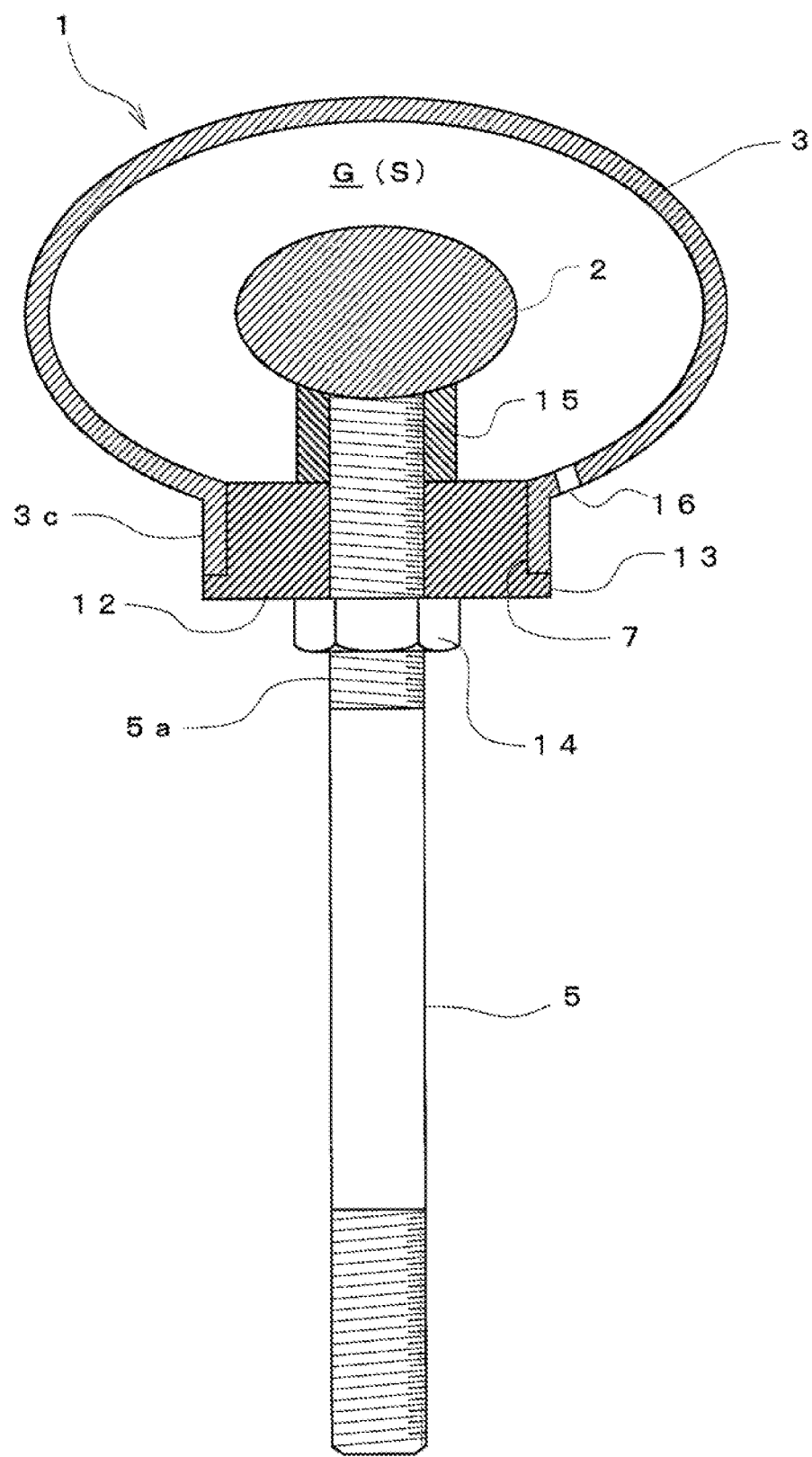
FIG. 8 is a longitudinal sectional view illustrating a sixth embodiment of the invention.

FIG. 8 illustrates a sixth embodiment of the invention, in which the shapes of the outer electrode body 3 and the inner electrode body 2 are elliptical in a vertical section instead of truly spherical as in FIG. 7. In FIG. 8, like elements which are basically the same as those in FIG. 7 are denoted by like reference numerals.

Also in the sixth embodiment, the inner diameter of the through-hole 7 of the outer electrode body 3 is set to be larger than the outer diameter of the inner electrode body 2. Accordingly, the inner electrode body 2 can be inserted into or taken out from the outer electrode body 3 by using the through-hole 7.

Figure 9:
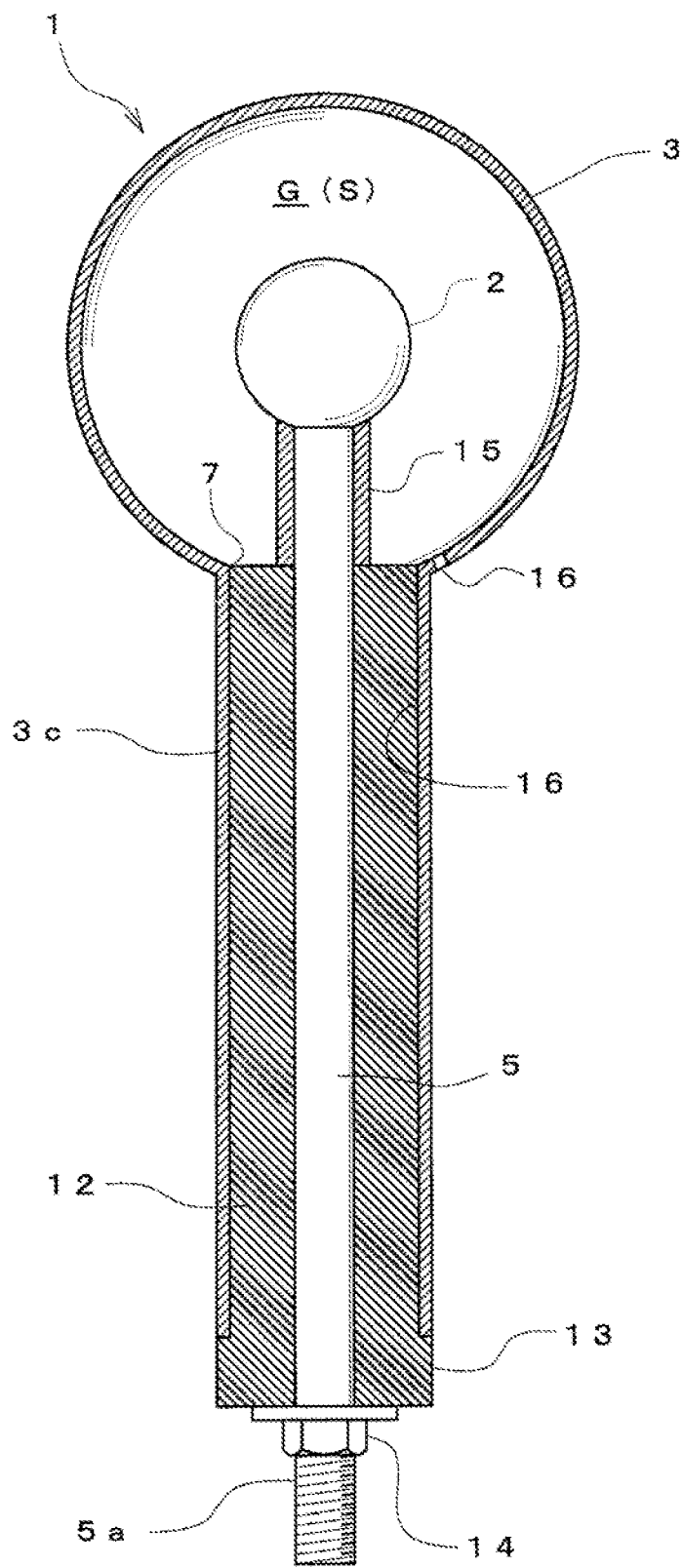
FIG. 9 is a longitudinal sectional view illustrating a seventh embodiment of the invention.

FIG. 9 illustrates a seventh embodiment of the invention.

In this embodiment, the outer electrode body 3 is formed in a continuous spherical shell shape, and from the lower portion thereof, the skirt portion 3c (hereinafter, referred to as a cladding tube) that is long and forms the through-hole 7 through which the support rod 5 is inserted extends. The long skirt portion 3c may be provided by welding a cylindrical member to the outer electrode body 3.

The first spacer 12 which has the support rod 5 inserted therethrough and holds the support rod 5 at a predetermined interval from the inner surface of the cladding tube 3c is attached to the cladding tube 3c.

The first spacer 12 is formed of an electrically insulating material and electrically insulates the support rod 5 from the cladding tube 3c.

The first spacer 12 is fitted into the cladding tube 3c from the outside of the outer electrode body 3, and is fixed to the cladding tube 3c by adhesion or screwing.

The collar 13 that is brought into contact with the lower end surface of the cladding tube 3c is formed integrally with the lower end portion of the first spacer 12, and by the contact between the collar 13 and the cladding tube 3c, positioning between the two is achieved.

On the other hand, the inner electrode body 2 is formed in a spherical body or a spherical shell and is formed to have an outer diameter smaller than the inner diameter of the cladding tube 3c formed in the outer electrode body 3 so that the inner electrode body 2 can be inserted into the outer electrode body 3 through the cladding tube 3c.

While the inner electrode body 2 is fixed to the tip of the support rod 5, the male thread 5a is formed in a predetermined region directed from the tip portion to the base end portion of the support rod 5.

The lock nut 14 is screwed to the support rod 5 via the male thread 5a, the first spacer 12 is fitted to a side closer to the tip of the support rod 5 than the lock nut 14, and the second spacer 15 which is cylindrical is fitted to a side closer to the tip of the support rod 5 than the first spacer 12.

As described above, in a state where the lock nut 14, the first spacer 12, and the second spacer 15 are attached to the support rod 5, the tip portion of the support rod 5 protrudes from the second spacer 15, and the inner electrode body 2 is fixed to the protruding tip portion.

By screwing the lock nut 14 toward the inner electrode body 2, the first spacer 12 and the second spacer 15 are interposed and fixed between the lock nut 14 and the inner electrode body 2.

By the fixing, the distance between the first spacer 12 and the inner electrode body 2 is set. However, this interval is determined by the thickness of the first spacer 12 and the length of the second spacer 15.

The inner electrode body 2 is inserted into the outer electrode body 3 through the through-hole 7 of the cladding tube 3c and is positioned in the outer electrode body 3 by the collar 13 of the first spacer 12 being brought into contact with the lower end of the cladding tube 3c.

Here, by setting the thickness of the first spacer 12 and the length of the second spacer 15, the inner electrode body 2 can be positioned at the center of the outer electrode body 3.

Accordingly, the gap G which is uniform over substantially the entire circumference between the inner electrode body 2 and the outer electrode body 3 can be formed.

That is, the electrical insulator S which is uniform due to the air can be formed around the inner electrode body 2.

The first spacer 12 and the support rod 5 may be screwed to each other using the male thread 5a, or the second spacer 15 can be formed of an electrically insulating material and integrated with the first spacer 12.

With such a configuration, the outer electrode body 3 can be formed of a single member, so that the number of components can be reduced, the configuration can be simplified, and the manufacturability can be improved.

Furthermore, since the long cladding tube 3c also functions as the outer electrode body 3 in addition to the outer electrode body 3, the lightning strike suppression effect can be exerted to a wide region. That is, a region in which the occurrence of an upward streamer as a streamer is suppressed can be configured to directly extend even to the lower side of the outer electrode body 3. Accordingly, the effect of suppressing the occurrence of a lightning strike can be increased.

The length of the cladding tube 3c is not particularly limited. In this embodiment, an example in which the cladding tube 3c has a length about twice the outer diameter (diameter) of the outer electrode body 3 is described. However, the cladding tube 3c may have a length of about half or twice or more the diameter of the outer electrode body 3. In order to effectively exhibit the function of the cladding tube 3c, the cladding tube 3c is preferably formed to be longer than the outer diameter (diameter) of the outer electrode body 3.

In addition, the first spacer 12 has only to exhibit an insulating function and a function as a spacer, and thus may be provided with an air hole or a gap that communicates with the inside and the outside of the outer electrode body 3. In addition, the support rod 5 directly supports the inner electrode body 2 and indirectly supports the outer electrode body 3, but may also be configured to directly support the outer electrode body 3 with a cylindrical body or the like and indirectly support the inner electrode body 2. In this case, the outer electrode body 3 may be supported via an insulator. With the configuration, the degree of freedom in the grounding structure of the inner electrode body can be increased. For example, it is possible to adopt a simple cylindrical member as the support rod 5.

In addition, the shapes, dimensions, and the like of the constituent members described in each of the embodiments are merely examples, and various modifications can be made based on design requirements and the like.

For example, the inner electrode body 2 and the support rod 5 may be integrally formed of a conductive metal such as stainless steel or an aluminum alloy. Furthermore, the first spacer 12 and the second spacer 15 may be integrally formed. In this case, the number of components can be further reduced and the assembly workability can be improved.

In addition, in the illustrated example, an example in which a threaded rod is used as the support rod 5 forming the support body is described. However, a configuration in which one end of the support rod 5 is welded to the inner electrode body using a cylindrical member may also be adopted. Furthermore, the other end of the support rod 5 may be provided with a connection flange or a threaded hole for connection to another cylindrical member.

Figure 10:
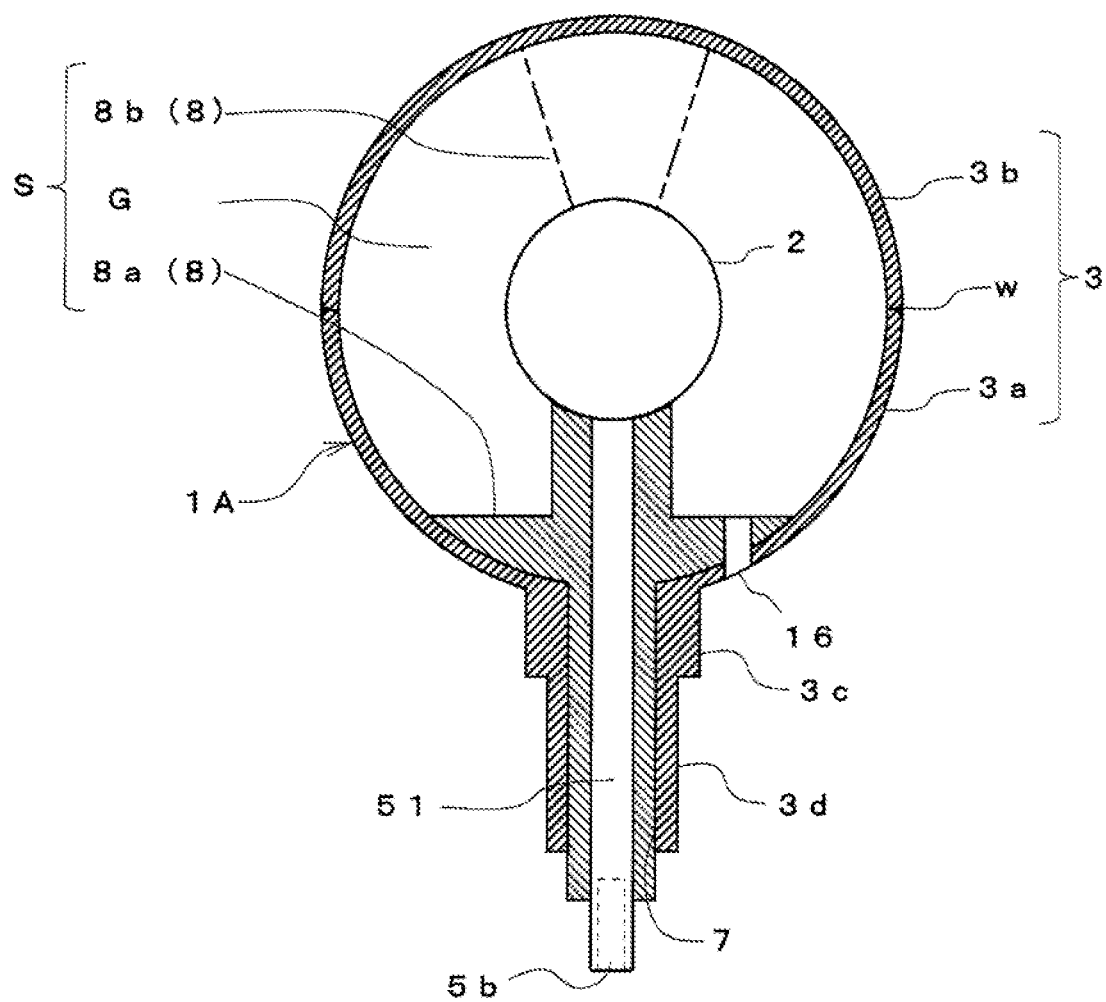
FIG. 10 is a longitudinal sectional view illustrating an eighth embodiment of the invention.
Figure 10:
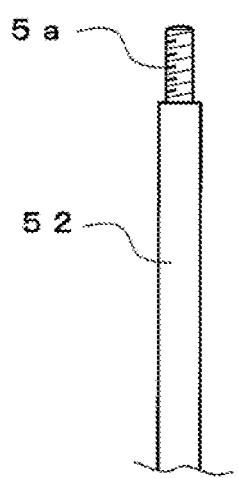
Figure 11:
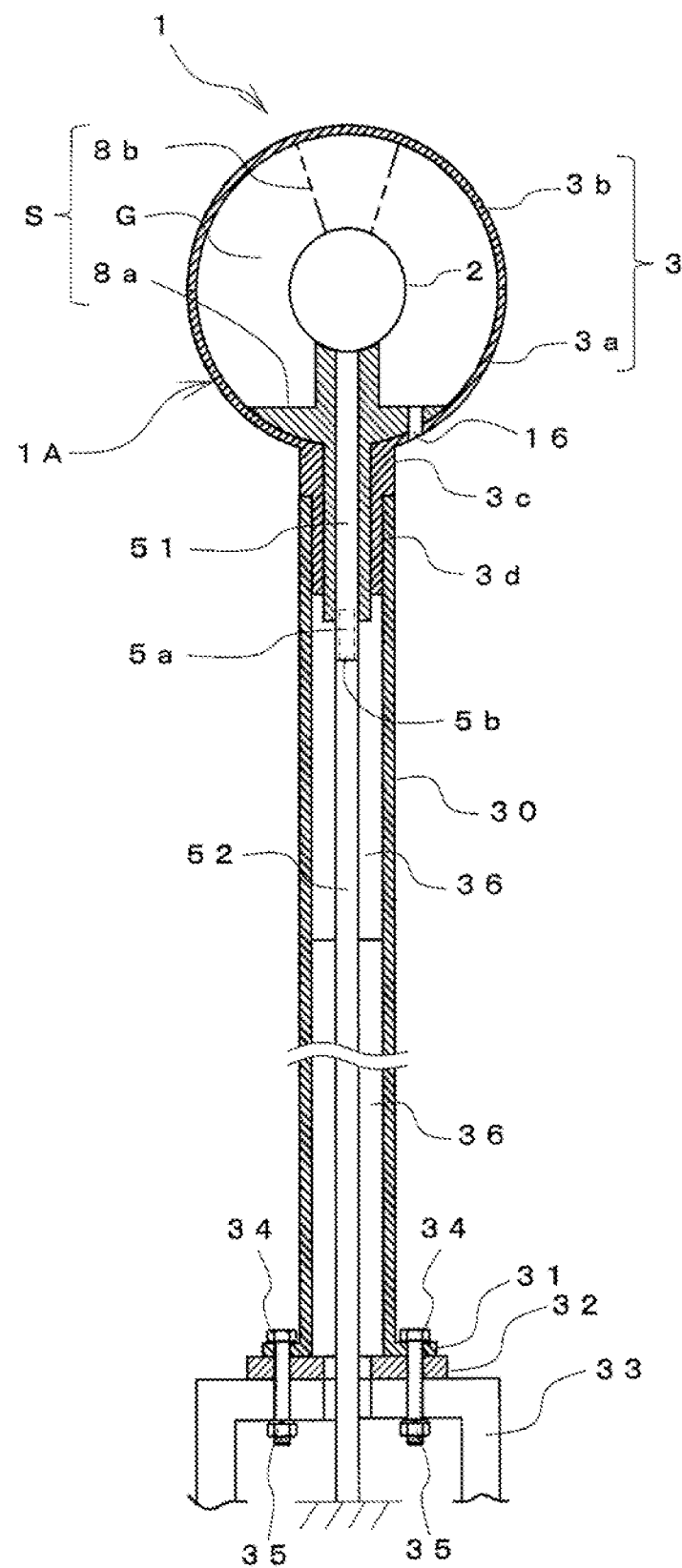
FIG. 11 is a longitudinal sectional view illustrating the eighth embodiment of the invention.

FIGS. 10 and 11 illustrate an eighth embodiment of the invention. FIG. 10 is a longitudinal sectional view of the lightning arrestor 1A portion, and FIG. 11 is a longitudinal sectional view of the lightning protection device 1 configured using the lightning arrestor 1A. In the drawings, like elements which are basically the same as those in the above embodiments are denoted by like reference numerals, and description thereof will be simplified.

As illustrated in FIG. 10, the lightning arrestor 1A of this embodiment includes the inner electrode body 2, the outer electrode body 3, the electrical insulator S, and a conductive grounding rod (support body) 51 connected to the inner electrode body 2.

In this embodiment, the inner electrode body 2 is formed in a spherical shape, the outer electrode body 3 is formed in a spherical shell shape, and the lower portion of the outer electrode body 3 is provided with the thick skirt portion 3c having the through-hole 7 of the grounding rod 51. In addition, the lower portion of the skirt portion 3c is provided with a cylindrical connection portion 3d for connection to a cylindrical support body 30 illustrated in FIG. 11. The outer diameter of the connection portion 3d is formed to be smaller than the outer diameter of the skirt portion 3c. Furthermore, the outer diameter of the connection portion 3d is formed to be slightly smaller than the inner diameter of the cylindrical support body 30.

Accordingly, the connection portion 3d which is cylindrical is configured to be coaxially fitted into the upper end portion of the cylindrical support body 30. Fixing of the connection portion 3d to the cylindrical support body 30 can be performed by welding, screwing, adhesive, threaded connection, or a combination thereof.

The upper end of the grounding rod 51 is electrically connected to the inner electrode body 2 by a fixing method such as threaded connection, welding, or adhesion. The grounding rod 51 is formed to have a length such that the lower end thereof protrudes downward beyond of the connection portion 3d, and the lower end thereof is provided with a threaded hole 5b for connection.

A connection rod 52 is coaxially connected to the grounding rod 51. The upper end of the connection rod 52 is provided with a male thread 5a to be screwed and connected to the threaded hole 5b of the grounding rod 51. The lower end of the connection rod 52 is grounded to the ground directly or via a grounding member.

The lower end of the cylindrical support body 30 is provided with an attachment flange 31. The attachment flange 31 portion is fixed to a support structure 33 by fastening means such as a bolt 34 and a nut 35. In this case, the attachment flange 31 may be directly fixed in a case where the support structure 33 is an insulator, but is fixed via an electrical insulator 32 in a case where the support structure 33 has conductivity.

The cylindrical support body 30 preferably has conductivity but may also be formed of a nonconductive material. In a case where the cylindrical support body 30 is formed of a conductive metal or the like, the cylindrical support body 30 is preferably provided therein with a cylindrical insulator 36 or the like having a hole through which the connection rod is passed.

According to the lightning protection device 1 of this embodiment, by allowing the cylindrical support body 30 to have conductivity, against the inner electrode body 2 which is positively charged when a thundercloud approaches, the surfaces of the outer electrode body 3, the cylindrical skirt portion 3c, and the cylindrical support body 30 can be negatively charged. That is, the cylindrical support body 30 can also function as the outer electrode body 3. Accordingly, a region in which the occurrence of an upward streamer as a streamer is suppressed can be configured to directly extend even to the lower side of the outer electrode body 3.

In the above embodiments, the support body 5 is configured to have both a function of supporting the inner electrode body 2 and the outer electrode body 3 and a function of grounding the inner electrode body 2, by using the support rod made of a conductive metal. Contrary to this, in this embodiment, by configuring the outer electrode body 3 to be supported by the cylindrical support body 30, the grounding rod 51 and the connection rod 52 can be configured to have only the grounding function. Accordingly, as the connection rod 52, for example, a pipe material, a grounding cable, a coated wire, or a bare wire can be used.

In addition, according to the lightning arrestor 1A of this embodiment, the entire structure can be simplified and made compact, so that transportation is facilitated.

Figure 12:
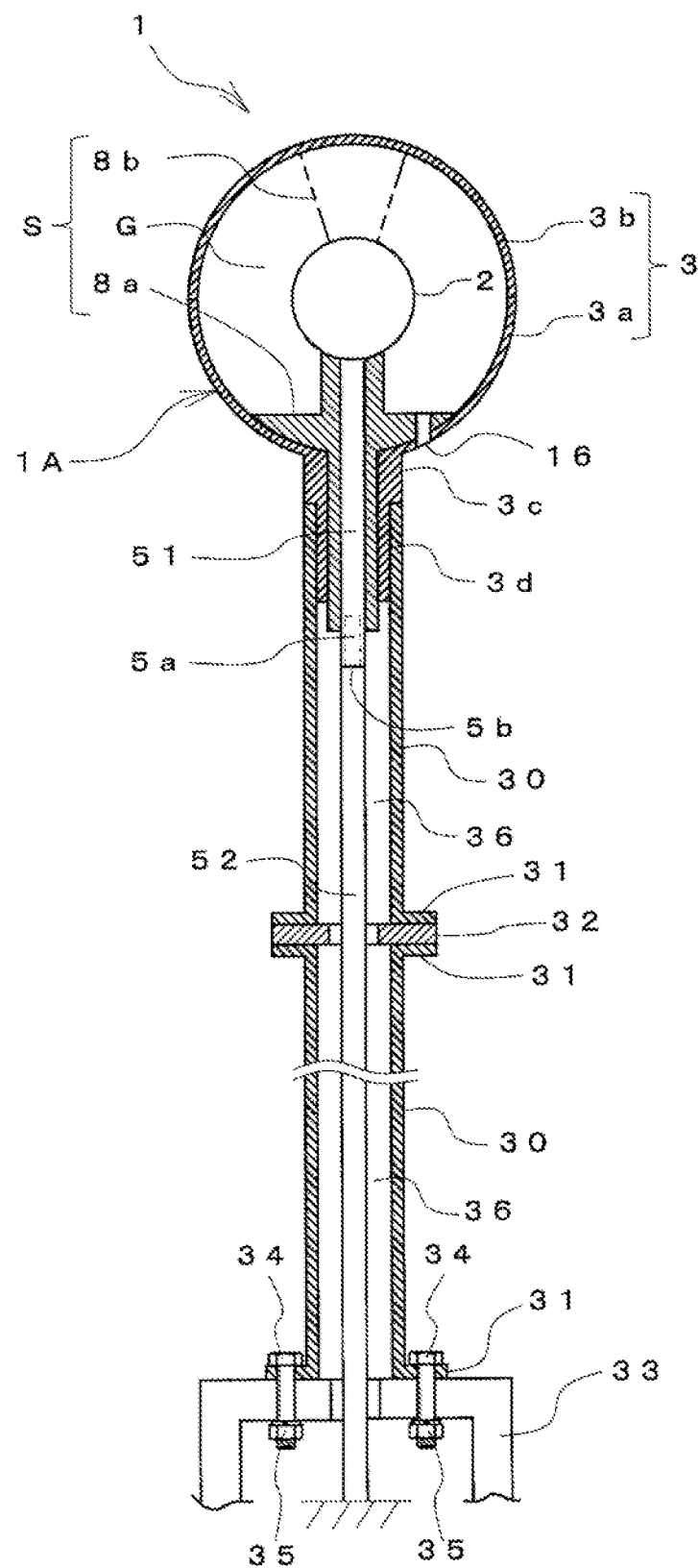
FIG. 12 is a longitudinal sectional view illustrating a ninth embodiment of the invention.

FIG. 12 illustrates a ninth embodiment of the invention, and is a longitudinal sectional view of the lightning protection device 1 configured using the lightning arrestor 1A in FIG. 10. In the drawings, like elements which are basically the same as those in the above embodiments are denoted by like reference numerals, and description thereof will be simplified.

In this embodiment, the cylindrical support body 30 has a multi-stage configuration (two-stage configuration in the illustrated example). That is, the cylindrical support body 30 disposed on the upper side and the cylindrical support body 30 disposed on the lower side are provided. The attachment flange 31 is provided at the lower end of the cylindrical support body 30 on the upper side, and the attachment flanges 31 and 31 are provided at the upper and the lower ends of the cylindrical support body 30 on the lower side. The flanges 31 and 31 vertically adjacent to each other are fastened and connected to each other by a bolt, a nut, and the like (not illustrated) via the insulator 32. The attachment flange 31 at the lowermost portion is fixed to the support structure 33 in a state of being in contact therewith by the bolt 34 and the nut 35.

In this embodiment, since the position of the insulator 32 is higher than that of the support structure 33, the soundness of the functions of the outer electrode body 3 and the cylindrical support body 30 can be secured. Furthermore, by using a plurality of the cylindrical support bodies 30, the height of the lightning protection device 1 can be arbitrarily adjusted.

In the above embodiments, an example in which the outer electrode body 3 has a spherical shell shape is described, but the invention is not limited thereto. For example, the outer electrode body 3 may be a hexahedron or a polyhedron with more faces. Furthermore, the outer electrode body 3 may have a hollow cylindrical shape.

Like the outer electrode body 3, the inner electrode body 2 may also be a hexahedron or a polyhedron with more faces. Furthermore, the inner electrode body 2 may have a hollow cylindrical shape or a cylindrical shape. Furthermore, the inner electrode body 2 may be configured by using a plurality of circular plates.

In addition, the inner electrode body 2 and the outer electrode body 3 may have a vertically elongated elliptical shape in a longitudinal section.

INDUSTRIAL APPLICABILITY

The lightning strike suppression type lightning protection device and the lightning arrestor of the invention can be effectively utilized as a lightning protection facility for protecting an object to be protected, such as various buildings, structures, various facilities, and communication facilities by suppressing lightning strikes.

EXPLANATIONS OF LETTERS OR NUMERALS 1 (LIGHTNING STRIKE SUPPRESSION TYPE) LIGHTNING PROTECTION DEVICE
2 INNER ELECTRODE BODY
3 OUTER ELECTRODE BODY
3a OUTER ELECTRODE CONSTITUENT BODY
3b OUTER ELECTRODE CONSTITUENT BODY
3c SKIRT PORTION
3d CONNECTION PORTION
31 ATTACHMENT FLANGE
32 INSULATOR
33 SUPPORT STRUCTURE
34 BOLT
35 NUT
4 NUT
5 SUPPORT ROD (SUPPORT BODY)
5a MALE THREAD
5b FEMALE THREAD
51 GROUNDING ROD
52 CONNECTION ROD
6 LOCK NUT
7 THROUGH-HOLE
8 SPACER
8a LOWER SPACER
8b UPPER SPACER
9 LOCKING HOLE
10 POSITIONING PROTRUSION
11 SCREW
12 FIRST SPACER
13 COLLAR
14 LOCK NUT

15 SECOND SPACER
16 INTERNAL PRESSURE ADJUSTMENT HOLE
C THUNDERCLOUD
E GROUND
G GAP (ELECTRICAL INSULATOR)
S ELECTRICAL INSULATOR
W WELDED PORTION

The invention claimed is:

1. A lightning strike suppression type lightning protection device comprising:
    an inner electrode body which is grounded;
    an outer electrode body which is provided so as to enclose the inner electrode body with a predetermined gap from the inner electrode body;
    an electrical insulator which is provided in the gap to hold the inner electrode body and the outer electrode body in a state of being electrically insulated from each other; and
    a support body which supports at least one of the inner electrode body and the outer electrode body,
    wherein the inner electrode body is formed in a substantially spherical shape or a spherical shell shape, and
    the outer electrode body is formed in a spherical shell shape.

2. The lightning strike suppression type lightning protection device according to claim 1,
    wherein the outer electrode body is formed in a spherical shell shape similar to an outer surface shape of the inner electrode body.

3. The lightning strike suppression type lightning protection device according to claim 1,
    wherein the inner electrode body and the outer electrode body have a substantially truly spherical shape.

4. The lightning strike suppression type lightning protection device according to claim 1,
    wherein the inner electrode body and the outer electrode body have an elliptical shape in a vertical section.

5. The lightning strike suppression type lightning protection device according to claim 1,
    wherein substantially an entire surface of the inner electrode body is covered by the outer electrode body.

6. The lightning strike suppression type lightning protection device according to claim 1,
    wherein the support body includes a conductive support body provided in the inner electrode body, and
    the conductive support body is grounded.

7. The lightning strike suppression type lightning protection device according to claim 1,
    wherein the support body includes a cylindrical support body provided in the outer electrode body.

8. The lightning strike suppression type lightning protection device according to claim 1,
    wherein a through-hole through which an inside and an outside of the outer electrode body communicate with each other is formed in a lower portion of the outer electrode body,
    the support body electrically connected to the inner electrode body is inserted through the through-hole in a state of being electrically insulated from the outer electrode body, and
    the inner electrode body is grounded via the support body.

9. The lightning strike suppression type lightning protection device according to claim 8,
    wherein the through-hole of the outer electrode body is set to a size through which the inner electrode body is able to be inserted into the outer electrode body.

10. The lightning strike suppression type lightning protection device according to claim 1,
    wherein the electrical insulator is constituted by a spacer which is disposed in the gap and is formed of an electrically insulating material which holds the inner electrode body and the outer electrode body at a predetermined interval, and a space formed in the gap.

11. The lightning strike suppression type lightning protection device according to claim 1,
    wherein the electrical insulator is configured by a spacer which is provided over an entire region of the gap formed between the inner electrode body and the outer electrode body and is formed of an electrically insulating material.

12. The lightning strike suppression type lightning protection device according to claim 1,
    wherein the outer electrode body is constituted by a pair of outer electrode constituent bodies formed to be divided into two parts, and
    the pair of outer electrode constituent bodies are caused to abut each other with the electrical insulator interposed between the outer electrode constituent bodies so as to enclose the inner electrode body, and are integrated by being connected in an electrically conductive state at abutting portions.

13. The lightning strike suppression type lightning protection device according to claim 12,
    wherein the pair of outer electrode constituent bodies are integrated by welding at the abutting portions.

14. The lightning strike suppression type lightning protection device according to claim 12,
    wherein the pair of outer electrode constituent bodies are integrated by being screwed to each other at the abutting portions.

15. The lightning strike suppression type lightning protection device according to claim 1,
    wherein the outer electrode body is formed in a spherical shell shape similar to an outer surface shape of the inner electrode body.

16. The lightning strike suppression type lightning protection device according to claim 1,
    wherein the support body includes a cylindrical support body provided in the outer electrode body.

17. A lightning strike suppression type lightning arrestor comprising:
    an inner electrode body;
    an outer electrode body which is disposed so as to enclose the inner electrode body with a predetermined gap from the inner electrode body; and
    an electrical insulator which is provided in the gap to hold the inner electrode body and the outer electrode body in a state of being electrically insulated from each other,
    wherein the inner electrode body is formed in a substantially spherical shape or a spherical shell shape, and
    the outer electrode body is formed in a spherical shell shape.

18. The lightning strike suppression type lightning arrestor according to claim 17,
    wherein the outer electrode body is formed in a spherical shell shape similar to an outer surface shape of the inner electrode body.

19. The lightning strike suppression type lightning arrestor according to claim 17,
    wherein the inner electrode body and the outer electrode body have a substantially truly spherical shape.

20. The lightning strike suppression type lightning arrestor according to claim 17, wherein the inner electrode body and the outer electrode body have an elliptical shape in a vertical section.

21. The lightning strike suppression type lightning arrestor according to claim 17,
    wherein substantially an entire surface of the inner electrode body is covered by the outer electrode body.

22. The lightning strike suppression type lightning arrestor according to claim 17,
    wherein the inner electrode body or the outer electrode body is provided with a connection portion for connection to a support body which supports at least one of the inner electrode body or the outer electrode body.

23. The lightning strike suppression type lightning arrestor according to claim 17,
    wherein a through-hole through which an inside and an outside of the outer electrode body communicate with each other is formed in the outer electrode body, and
    the support body electrically connected to the inner electrode body is inserted through the through-hole in a state of being electrically insulated from the outer electrode body.

24. The lightning strike suppression type lightning arrestor according to claim 23,
    wherein an inner diameter of the through-hole of the outer electrode body is set to be smaller than an outer diameter of the inner electrode body.

25. The lightning strike suppression type lightning arrestor according to claim 23,
    wherein an inner diameter of the through-hole of the outer electrode body is set to be larger than an outer diameter of the inner electrode body.

26. The lightning strike suppression type lightning arrestor according to claim 23,
    wherein the outer electrode body is provided with a cylindrical skirt portion forming an inner wall surface of the through-hole.

27. The lightning strike suppression type lightning arrestor according to claim 26,
    wherein a length of the skirt portion is larger than an outer diameter of the outer electrode body.

28. The lightning strike suppression type lightning arrestor according to claim 17,
    wherein the inner electrode body and the support body are integrated with each other by welding.

29. The lightning strike suppression type lightning arrestor according to claim 17,
    wherein the inner electrode body and the support body are integrally formed by a conductive metal.

30. The lightning strike suppression type lightning arrestor according to claim 17,
    wherein the outer electrode body is formed in a spherical shell shape similar to an outer surface shape of the inner electrode body.

* * * * *